(12) United States Patent
Kraft et al.

(10) Patent No.: US 6,529,899 B1
(45) Date of Patent: Mar. 4, 2003

(54) SYSTEM AND METHOD FOR REGISTERING AND PROVIDING A TOOL SERVICE

(75) Inventors: Reiner Kraft, Gilroy, CA (US); Neelakantan Sundaresan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/481,164

(22) Filed: Jan. 12, 2000

(51) Int. Cl.[7] ............................................. G06F 17/30
(52) U.S. Cl. .................. 707/3; 707/2; 707/4; 707/9; 707/10; 707/200
(58) Field of Search ............................. 707/1–3, 4, 10, 707/200, 9

(56) References Cited

U.S. PATENT DOCUMENTS

| | | | | |
|---|---|---|---|---|
| 5,907,838 A | * | 5/1999 | Miyasaka et al. ............... | 707/4 |
| 6,278,993 B1 | * | 2/2000 | Kumar et al. .................. | 707/3 |
| 6,151,624 A | * | 11/2000 | Teare et al. ................. | 709/217 |
| 6,212,545 B1 | * | 4/2001 | Ohtani et al. ............... | 709/202 |
| 6,338,050 B1 | * | 1/2002 | Conklin et al. ............... | 705/80 |

OTHER PUBLICATIONS http://www.ibm.com/developer/java.
http://www.xml.com.
http://jigsaw.w3.org:8000/description.
http://www.w3.org/RDF/Implementations/SiRPAC.

* cited by examiner

*Primary Examiner*—Kim Vu
*Assistant Examiner*—Cam-Y T Truong
(74) *Attorney, Agent, or Firm*—Jon A. Gibbons; Fleit, Kain, Gibbons, Gutman & Bongini P.L.

(57) ABSTRACT

A system and method for associating a personalized application tool and/or service in response to data supplied by any number of search requests is disclosed. The present invention in some preferred embodiments integrates a Session Manager (0701), Tool/Service Integrator (0702), Result Analyzer (0703), Registration Manager (0704), and a Request Server (0705) in conjunction with a DTD Schema (0707), a Tool/Services Database (0706), and an Optional Accounting Manager (0708). Several preferred embodiments of the present invention are configured to process user search requests (0711) comprising Internet search queries (0712) that are subsequently processed by an Internet Search Engine (0713) under control of a Session Manger (0701). The focus of the present invention is to permit brokering of search results post-processing tools and/or services, thus improving the overall efficiency of the searching and data analysis functions by a given user.

33 Claims, 9 Drawing Sheets

| General | View | File Types |

Registered file types:

- ☐ Text Document
- ☐ TextFXDocument
- ☐ TIFF Image
- ☐ TIFF file
- ☐ True Type Font file
- ☐ TurboCad
- ☐ TurboCAD Drawing
- ☒ Type 1 Multiple Master Metrics
- ☐ Ultimate Label Maker Original Templa

[ New Type... ]
[ Remove ]
[ Edit... ]

File type details
- ☐ Extension      TIF TIFF
- ☐ Content Type (MIME)    Image/TIFF
       Opens with       KODAKPRV

[ OK ] [ Cancel ] [ Apply ]

0202

---

Click the program you would like to use to open the File 'ABC XXX'. If the program you want is not in the list, click Other.

Description of XXX Sites

Choose the program you want to use

- ☐ IKE406
- ☐ ACCM2
- ☐ ACOSue32
- ☐ Acrobat
- ☐ A
- ☐ adbook
- ☐ AIM
- ☒ ATMFM ☑ Always give this program to

[ OK ] [ Cancel ] [ Other ]

| | Change Icon... |

Description of type: | TIF Image |

Content Type (MIME): | Image/tiff ▽ |

Default Extension for Content Type: | tif ▽ |

Actions

| open |

| New... | Edit... | Remove | Set Default |

☐ Enable Quick View    ☑ Confirm open after download
☐ Always show extension  ☐

| OK | Cancel |

*FIG. 2B*
*(PRIOR ART)*

Java Source Code 5) http://www.cs.cityu.edu.hk/~mli/cs3181applets/ass3/30/HeapSort.java
Classes: HeapSort
Abstract: (No description available) [Details] [Map]

6) http://www.ee.umanitoba.ca/~blight/c24451/heapsort.java
Classes: heapsort
Abstract: (No description available) [Details] [Map]

7) http://www.ee.umanitoba.ca/~blight/c24451/heap_test.java
Classes: heap_test
Abstract: (No description available) [Details] [Map]

8) http://www.cs.cityu.edu.hk/~mli/cs3181applets/ass3/2/HeapSort.java
Classes: HeapSort
Abstract: (No description available) [Details] [Map]

9) http://wesley.informatik.uni-freidburg.de/~unruh/Vorlesungen/Infoil/sortTest2.java
Classes: comparable array heapSort comparableInt sortTest
Abstract: * File: sortTest.java * Beschreibt das Verhalten vergleichbarer Objekte * Hilfs- Klasse array.client zun Vertauschen * von zwei Eintraegen in beliebigem Array von Objekt... abstract class comparable Erzeuge einen He Carry on in the name of the Lordl i=m; (weeer schreibt so' nen Scheiss? Pascal- Fuzzisi ) key hier koennte no
[Details] [Map]

PRESENT INVENTION EXEMPLARY REQUEST INPUT DIALOG

Search [ ] in [xCentral ▷]

Developers : XML Guide : xCentral search results - XML documents

42 search results of "stocks" found : Page 1 of 3

For Page 1, results were found in the highlighted categories:

XML documents (19)   DTD Schemas (1)   Newsgroup Articles (D)   Other XML resources (D)

Page 1 | 2 | 3

---

XML documents 1) http://tecfs.unige.ch/guides/xml/examples/shakespeare.1.10.xml/lear.xml

[TreeViewer ▷]

Rank: 2.6%

Valid: ☐ Wellinformed: ☐

Abstract: http:tecfa.unige.ch/guides/xml/examples/shakespeare.1.10.xml/lear.xml PLAY The Tragedy of King Lear Text placed in the public domain by Moby Lexical Tools, 1992. SGML markup by Jon Bosak, 1992-1994, X 2) http:tecfa.unigr.ch/guides/sm/examples/

[TreeViewer ▷]

Rank: 2.8%

Valid: ☐ Wellinformed: ☐

*FIG. 5*   *PRESENT INVENTION EXEMPLARY SEARCH RESULTS PAGE*

DTD Schemas

20) http://www.iptc.org/iptc/Nitf20b1.dtd

Bean Maker ▽ ■

0601

Rank: 20.8%

Abstract: http:www.iptc.org/iptc/Nitf20b1.dtd This is the NITF DTD DOCTYPE NITF PUBLIC "IPTC-NAA/DTA NITF 2.0b1/EN" #0 News Industry Text Format Instance 1 Document Heder Information 2 Document Tr XML documents (19)    DTD Schemas (1)    Newsgroup    Other XML resources (D)

Page 1 | 2 | 3

☑    ☑    Modify search [stocks]    ☐    ■

© 1999 IBM Corporation

*PRESENT INVENTION*
*EXEMPLARY TYPE-SPECIFIC TOOL/SERVICES*

FIG. 6

SYSTEM AND METHOD FOR REGISTERING AND PROVIDING A TOOL SERVICE

PARTIAL WAIVER OF COPYRIGHT

All of the material in this patent application is subject to copyright protection under the copyright laws of the United States and of other countries. As of the first effective filing date of the present application, this material is protected as unpublished material. However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

CROSS-REFERENCE TO RELATED APPLICATIONS

Not Applicable

BACKGROUND OF THE INVENTION

1. Field of the Invention

The present invention relates generally to field of Internet Search Engines, Web browsers, and resource gathering and has special application in situations where these functions are further integrated with post-processing functions applied to the results of searches performed using theses software tools.

2. Description of the Related Art

The invention is related in the general area of Internet Search engine technology. Conventional Internet search engines permit users to search for a wide variety of information on the WWW. There are also domain-specific search engines (such as that exemplified by jCentral, http://www.ibm.com/developer/java) that provide users a more focused search within the desired domain.

Typically a successful search produces a search results page with result items (each usually contain a URL), an abstract, and some additional information about the resource found. A user can use a pointing device (e.g., mouse) to select a result item and request a download of the document. This is typically a manual process, with no existing system providing a predefined method of associating a post-processing application with the search results provided by the Internet search engine.

The prior art with few exceptions has no system or method available to associate tools and/or applications with the results of Internet search results. Web-Based Prior Art The prior art includes web-based systems that provide a static assignment of web tools and/or services mapped to search results. As an example, jCentral (http://www.ibm.com/developer/java) offers a class visualizer for Java source code or for Java applets.

There exist web sites that provide facilities such as "type in a URL which points to a particular document" and provide static tools such as "check for well-formed character of XML documents" or "draw a graph corresponding to a particular RDF documents", etc. These functions are not integrated with search engines and also do not provide a choice mechanism to pick tools and/or services. Examples of URLs implementing these functions include http://www.xml.com/xml/pub/tools/ruwf/check.html and http://jigsaw.w3.org:8000/description, and http://www.w3.org/RDF/Implementations/SiRPAC/.

The present invention, however, goes beyond these concepts by acting as a broker for software components (tools and/or services). The user can register their tools and services and these are then automatically integrated into search engine search results pages.

File Extension Based Prior Art

However, it should be noted that a variety of static and/or contextual application/data associations are known in the art. Specifically, the Microsoft® Windows™ operating environment permits association of a file "type" as determined by a filename extension to be associated with a given handling application. The structure of this application association is illustrated in FIG. 1, with the modal dialog boxes implementing this functionality illustrated in FIG. 2.

Referencing FIG. 1, an exemplary association of a Tagged Image File Format (TIFF) file is illustrated to show the techniques used by the prior art. In this configuration the tool and/or service association begins by using registration dialog(s) (0101) (detailed in FIG. 2 (0201, 0202, 0203)) that associate an application such as the KODAK® image previewer KODAKPRV.exe with the "tif" file extension (0102). This association is typically stored in a Microsoft® Windows™ Registry (0103).

When a file is activated/selected that does not have an associated application for processing, a typical response to this situation is illustrated in the modal dialog box (0201) of FIG. 2 in which the application to be utilized is prompted for by the file manager or other application. In this example, the file extension of 'XXX' has yet to be registered in the Microsoft® Windows™ registry, and thus the system prompts for an application to OPEN the file "ABC.XXX". This method is generally not preferred as it requires that the user select the activation application for each invocation of the file to be processed.

As an example of how this functionality is executed, the filename "ABC.tif" (a Tagged Image Format File having a "tif" extension) may be selected within an application such as the FILE MANAGER (0105) and associated with a specific application such as the KODAKPRV.EXE image previewer using the modal dialog box illustrated in FIG. 2 (0202). The application action and/or activation associated with triggering (generally in the form of double-licking a Microsoft® Windows™ file icon) the file is defined in a modal dialog box as typified in FIG. 2 (0203). Referencing FIG. 1, it can be seen that the KODAKPRV.exe application (0104) is activated by reference to the Microsoft® Windowsυ Registry (0103), the tool/service executed (0106), and the designated file is OPENed for access by the associated application (0107) by using the filename "ABC.tif" as a parameter to the tool/service application.

As with other methods of associating filename extensions to application activations, the prior art requires that for each application file the filename extension be properly keyed to permit proper association of the control application for that file type. This is a significant problem in processing data generated by a wide variety of search engines, as this information is generally not tagged with appropriate filename extension information.

Search Engine Prior Art

Referencing FIG. 3, the prior art with respect to search engines has traditionally not provided a method to permit the user to dynamic associate post-processing tools with the search results obtained from a web browser. The scope of the post-processing activity has in general been limited to the use of hyperlinks (0301) or some form of file extension based application activation methodology.

Accordingly, a need exists to overcome the deficiencies in the prior art and to provide a system and method to permit automatic activation of user-defined applications in response to the Internet search request results. A need exists to provide a system and method to allow a wide variety of service applications and tools to be associated with the results of Internet searches. Moreover, a need exists to permit a user to trigger a given application to post-process the data content of a given URL and to permit tools and/or services to be automatically brokered to users of search engine post-processors.

SUMMARY OF THE INVENTION

The invention is related in the general area of Internet Search engine technology. The present invention extends the prior art by providing the user the opportunity to allow search result items to be automatically used as an input for post-processing based on registered tools and/or services. These tools and/or services determine the type of processing to be applied to a search result item. The present invention therefore acts as a broker for tools and/or services. The user can register their tools and/or services with the search engine and make them available for activation by other users that utilize the present invention.

As an exemplary implementation of the present invention, the user would start a query by entering some keywords and submitting the query to a search engine as illustrated in FIG. 4. This interaction typically takes place using a search dialog box (0401).

Referencing FIG. 5, the present invention then performs the query and returns a result set. Depending on the type, the search engine dynamically creates a choice of specific tools and services (0501) that are presented along with the search results (0502).

Referencing FIG. 6, a user may select a desired resource and activate the associated tool and/or service (0601). Note that the choices of tools are different depending on the return data type. For instance, with XML documents the user has the choice of selecting a "Tree View" tool that shows a graphical representation of the structure of the document. XML schemes (DTDs) can be used as an input for the "Bean Maker" tool (0601) that essentially converts the DTD into a Java Bean. The DTD is the Document Type Definitions of the W3C XML 1.0 standard which provides a way to define the structure of an XML document through a document type definition. DTDs have widespread support in the industry and in the XML applications that are currently available. In simple terms, we use a DTD to define the structure of the XML file by using special characters that indicate pattern for these elements. For a more detailed description we refer to current literature about XML.

After selecting a type-specific tool and/or service (e.g., Bean Maker), the request is then sent to the present invention that in turn downloads the requested document and post processes this document using the desired tool. All of this activity is performed on the server side, but the present invention is not strictly limited to this configuration. A user need not download or setup any software to process the document, as this is automatically performed by the present invention. The result of this process is then presented to the user.

EXAMPLE

To illustrate the teachings of-the present invention, a concrete example based on the jCentral search engine (http://www.ibm.com/developer/java) will now be provided. jCentral lets users search for Java resources using Java specific search features. With the present invention, a user would typically first register a tool and/or service. In this example, the user wants to register a Java compiler. The present invention then provides a registration form. The user then would typically apply for a username and a password for data protection purposes. At this point the following information is provided for the application tool:

| Tool: | Java Compiler (Friendly name) |
|---|---|
| Filename: | javac.exe |
| Local Path: | C:\jdk1.2 |
| Arguments: | 1. [options] |
| | 2. URL |
| Cost: | $0.05 per invocation |

Cost: $0.05 per invocation

The information is stored on the server side in a database and associated with the user's profile.

Once registered, the user is able to perform a search. In this example the user is searching for Java source code, which implements a heap sort algorithm. He/She fills out the jCentral search form and issue a query to the jCentral search engine. Note that the present invention could use a "Cookie" mechanism to store the tool information also on the client machine and retrieve the data as part of the search request. This is just another way of implementing the user profile.

The present invention receives the search request and queries the database for the user profile (or extract the cookie data from the search request). It then forwards the search request to the actual search engine: Before sending back the results page it inserts the display (HTML) markup for the user defined tool and/or service. As a result the search results contain a choice selection GUI where the user can activate a personalized tool and/or service. FIG. 5 illustrates an exemplary jCentral results page that was generated from the present invention. Note that the "Java compiler" dialog choice box was generated from the present invention based on the registered user profile of the user.

Exemplary Advantages

Overall the present invention can in some exemplary embodiments provide one or more of the following advantages over the prior art:

(1) By offering the user the possibility to link personalized tools and/or services with the search results of a search query, the user permits these tools and services to be made instantly available to other users. This permits distribution of software applications in an efficient and convenient manner. This provides for a new business model for the present invention, in which the user who wants to make use of a tool or service has to pay a small fee to the broker. The present invention can be extended to permit a database to track expenses and fees within this business model. The broker will keep its margin and transfer the rest of the earned money to the provider of the service.

(2) Tools and services are provided on demand. A user is not required to download and setup software on a local machine, but rather these services may be hosted on a server machine elsewhere, and therefore the local user need not maintain the application.

(3) The tools and services are automatically linked to a search result item from a corresponding search query. Thus, the input data is automatically associated with the corresponding tool and service and therefore provides a degree of convenience for the user.

The present invention has wide application in the application of web-based services, and since these applications will become more dominant in the future, the present invention may provide for additional benefits other than described above. One skilled in the art will realize that these advantages may be present in some embodiments and not in others, as well as noting that other advantages may exist in the present invention that are not specifically listed above.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings.

FIG. 2 illustrates a prior art modal dialog box (0201) used within the Microsoft® Windows™ operating environment to define activate an application in response to a typed filename extension, a prior art modal dialog box (0202) used within the Microsoft® Windows™ operating environment to define a filename extension to application activation link, and a prior art modal dialog box (0203) used within the Microsoft® Windows™ operating environment to define an activation function associated with triggering a file by filename extension;

FIG. 3 illustrates a prior art Internet search results page;

FIG. 5 illustrates an exemplary Internet search results page generated by the present invention;

FIG. 6 illustrates exemplary type-specific tools/services that may be provided by some preferred embodiments of the present invention;

DETAILED DESCRIPTION OF AN EMBODIMENT

Figure 1:
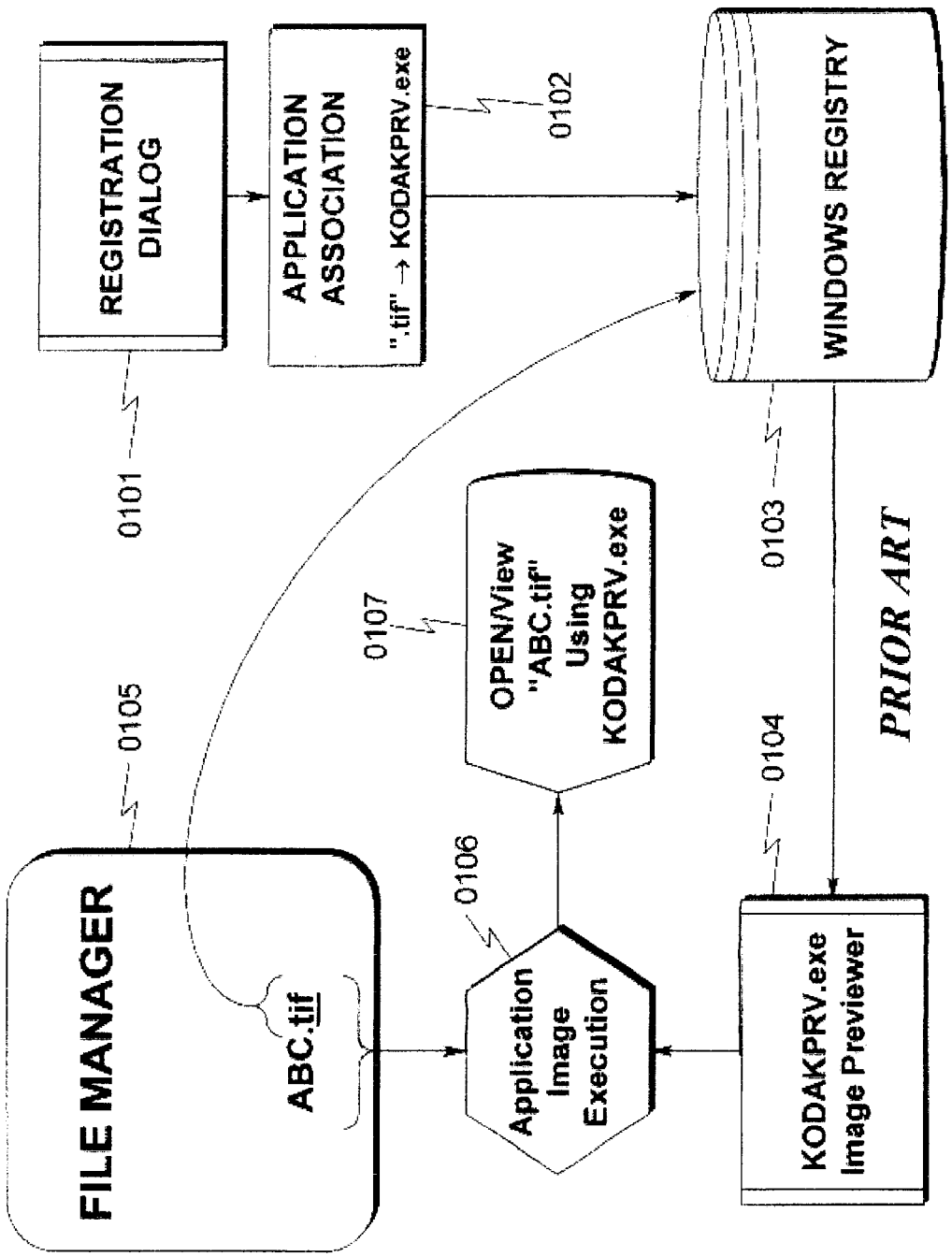
FIG. 1 illustrates a prior art system block diagram of how conventional application tool associations are performed within the Microsoft® Windows™ operating environment.
Figure 4:
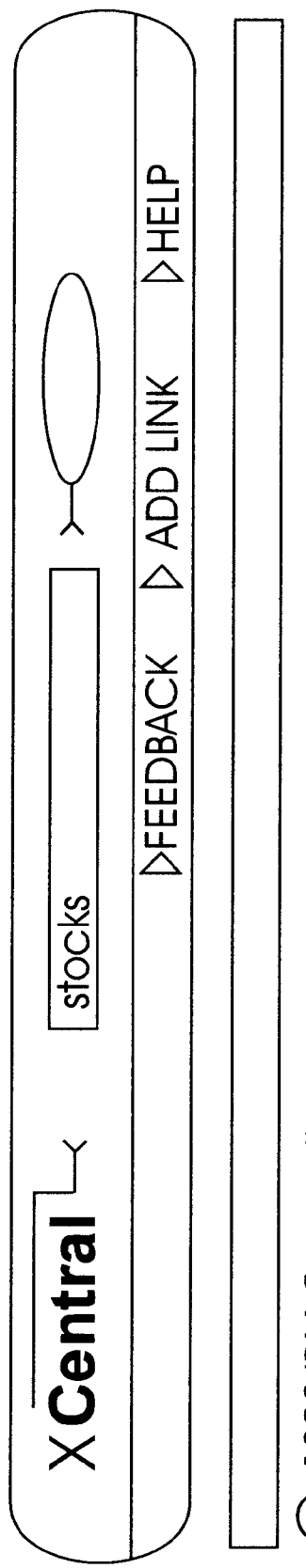
FIG. 4 illustrates an exemplary Internet search dialog that may be used in some embodiments of the present invention.

However, it should be understood that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and visa versa with no loss of generality.

Definitions

Throughout the discussion in this document the following definitions will be utilized:

System Blocks/Procedural Steps Not Limitive—The present invention may be aptly described in terms of exemplary system block diagrams and procedural flowcharts. While these items are sufficient to instruct one of ordinary skill in the art the teachings of the present invention, they should not be strictly construed as limiting the scope of the present invention. One skilled in the art will be aware that system block diagrams may be combined and rearranged with no loss of generality, and procedural steps may be added or subtracted, and rearranged in order to achieve the same effect with no loss of teaching generality. Thus, it should be understood that the present invention as depicted in the attached exemplary system block diagrams and procedural flowcharts is for teaching purposes only and may be reworked by one skilled in the art depending on the intended target application.

Personal Computer Not Limitive—Throughout the discussion herein there will be examples provided that utilize personal computer (PC) technologies to illustrate the teachings of the present invention. The term 'personal computer' should be given a broad meaning in this regard, as in general any computing device may be utilized to implement the teachings of the present invention, and the scope of the invention is not limited just to personal computer applications. Additionally, while the present invention may be implemented to advantage using a variety of Microsoft® operating systems (including a variety of Windows™ variants), nothing should be construed to limit the scope of the invention to these particular software components. In particular, the system and method as taught herein may be widely implemented in a variety of systems, some of which may incorporate a graphical user interface.

Internet/Intranet Not Limitive—Throughout the discussion herein the terms Internet and Intranet will be used generally to denote any network communication system or environment. Generally the term Intranet will denote communications that are local to a given system or user, and Internet will describe communications in a more distant local. One skilled in the art will recognize that these terms are arbitrary within the contexts of modern communication networks and in no way limitive of the scope of the present invention.

Post-Processing Not Limitive—While the present invention has special application to situations in which search results data is to be post-processed by an application tool and/or service, nothing in the scope of the teachings of the present invention should be interpreted to limit the scope of application to this field. One skilled in the art will quickly recognize the applicability of the present invention to other data processing applications, including but limited to pre-processing of search results and filtering of search queries prior to or during the searching process.

Web Browser Not Limitive—Throughout the discussion herein the present invention will be discussed in terms of applications involving a web browser. However, the scope of the present invention should not be limited to this specific application.

Furthermore, while the present invention may incorporate means for activating the application tool and/or service, this function may be incorporated in some system components not a part of the invention as implemented. Furthermore, the application association need not result in a mandatory invocation of the target handling tool and/or service for the teachings of the present invention to apply.

Tool/Service Not Limitive—Throughout the discussion herein the present invention the term 'tool/service' will encompass software "tools", "services", "tools and services", and "tools or services" any combination, and should be interpreted in its broadest sense to mean any means for software processing, including both pre-processing and post-processing of information.

HTML Markup Not Limitive—Throughout the discussion herein the present invention the term 'display markup' or 'HTML markup' should be interpreted in its broadest sense to indicate any language, system, or method of producing formatted visual displays. This term is specifically anticipated to encompass HTML markup languages and the like as well as any other flavor of existing or future formatting that is capable of being interpreted to generate a visual display.

System Overview

The present invention generally provides the following features:
(1) A mechanism for the tool provider to register the tool application with a description, the result type on which the tool operates, the cost of applying the tool, etc.
(2) A mechanism to invoke the application tool. The tool provider must provide a tool invocation mechanism based on the API published by the search engine. This requirement can be relaxed where the tool provider specifies to the search engine how to invoke the specific tool.
(3) A mechanism for the search engine to register the tool.
(4) A mechanism for an end user to check out a particular tool and apply it to a given search result.
(5) A mechanism to invoke the tool on a search result and publish the result of the tool to the client in an appropriate form using an appropriate MIME type.

These features may generally be accomplished by the exemplary system architecture that will now be discussed in detail.

Exemplary System Architecture (0700)

Figure 7:
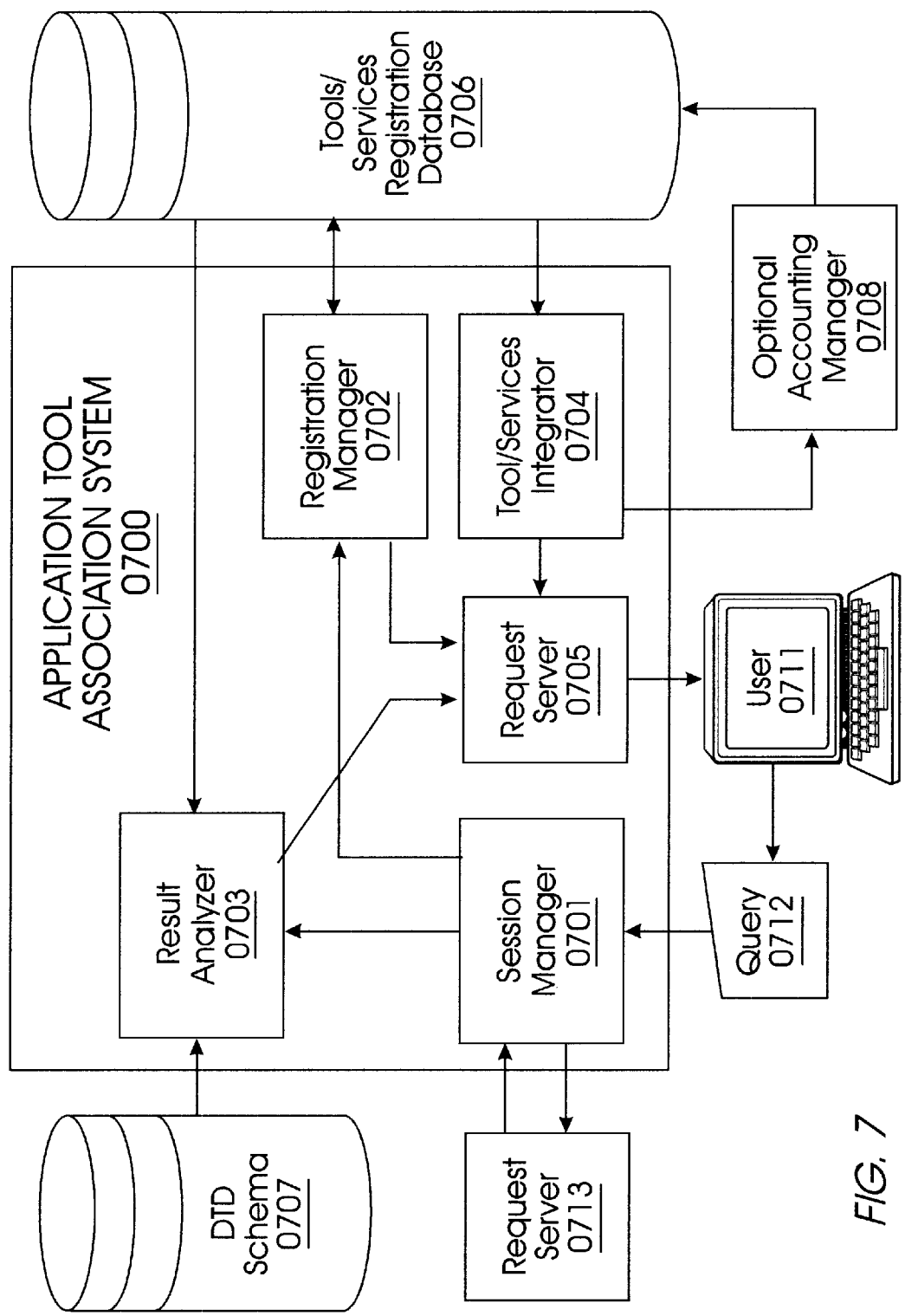
FIG. 7 illustrates a system block data flow diagram of an exemplary embodiment of the present invention.

Referring to FIG. 7, the exemplary system (0700) comprises of the following components:
(1) Session Manager (0701);
(2) Registration Manager (0702);
(3) Result Analyzer (0703);
(4) Tool/Service Integrator (0704);
(5) Request Server (0705);
(6) Tool/Service Database (0706);
(7) DTD Schema for Search Engine (0707);
(8) Optional Accounting Manager (0708).

These system elements will now be discussed in detail.

Session Manager (0701)

First, the Session Manager (0701) receives a request from the user, typically in the form of a query (0712) generated from some user interface (0711). The Session Manager (0701) coordinates user and session management. The main task of the Session Manager (0701) is to analyze the request and to determine whether the request represents a user query or a tool/service invocation for a specific URL. In case the request is a search request, the Session Manager will forward the request to the Search Engine (0713). Otherwise, it will forward the tool/service registration request to the Registration Manager (0702). Any status and error messages will be forwarded to the Request Server (0705).

Registration Manager (0702)

The Registration Manager (0702) receives registration requests from the Session Manager (0701). The Registration Manager (0702) manages the users of the search engine, stores and retrieves user profiles, etc. In case of a registration for a new tool or service based upon a registration request, the Registration Manager (0702) adds the provided information about a new tool/service (e.g., Tool URL, Name, Parameters, etc.) to the user Tools/Services Registration Database (0706) and associates it with the user's profile.

This database can also contain accounting information. For instance, a user could charge a fee for using the tool or service. Moreover, the provider of the present invention can also in some circumstances gain profit by brokering the services. In this case there is an optional additional component (an Accounting Manager (0708)) that takes care of these accounting issues. The present invention may be implemented with or without this optional component.

Result Analyzer (0703)

The Result Analyzer (0703) receives search results from the Search Engine (0713) based upon a user's search request. Before the Result Analyzer (0703) does any work it will perform a lookup using the session/user ID of the user who issued the search request to determine whether there are any registered tools or services of other users that could be used for the search result items. If not, the Result Analyzer (0703) will do nothing and forward the search result page directly to the Request Server (0705).

Otherwise, the Result Analyzer (0703) analyzes the search result page and extracts the URLs of the found external resources. It then analyzes the search results page and extracts the URLs of the found external resources. This is accomplished by applying the knowledge from the DTD Schema (0707) that provides information of how to extract key information and use the search results page.

The extracted URLs will be marked so that the Tool/Service Integrator (0704) can rapidly identify these items. As an example this markup might take the following form:
<BEGIN_URL>http://www.ibm.com/e-business/</BEGIN_URL>

When the URLs in the search results page are identified, the modified result page will be routed to the Tool/Service Integrator (0704) along with the session ID.

Tool/Service Integrator (0704)

At this point the Tool/Service Integrator (0704) performs a lookup based on the session/user ID in the Tools/Services Registration Database (0706) to determine what tools are registered and what type of URL they can process. The Tool/Services Integrator (0704) then assigns all available tools matching a specific URL type to each result URL.

The present invention provides all tools and services that are available for handling a specific type of resource. The integration is accomplished by inserting HTML markup tags within the result page. These tags may then be later activated by the user to invoke the registered tool. Note that the Tool/Services Integrator (0704) erases the previous markup inserted by the Result Analyzer (0703). This markup is not longer required, and was temporarily used by the Tool/Services Integrator to rapidly identify the URLs in the search result page. When the Tool/Services Integrator has completed inserting the necessary markup in the search results page, it forwards the newly created results page to the Request Server (0705).

Request Server (0705)

The Request Server (0705) returns all the received data back to the user. It processes the obtained data either from the Tool/Services Integrator (0703) or the Registration Manager (0702), adds some optional formatting and status information and returns the content back to the User (0711).

Tool/Service Hosting

It should be noted that the tools and services mentioned herein need not be processed nor hosted by the present invention. The present invention acts as a broker for these tools and services and generally provides only the registration mechanism for these tools and services, the corresponding user profile management, and the optional accounting management. During a search query the present invention associates URLs within a user request with tools and services that are registered by other users and which are designed to handle a specific type of search results page resource.

Exemplary Application Tool Association Method

Figure 8:
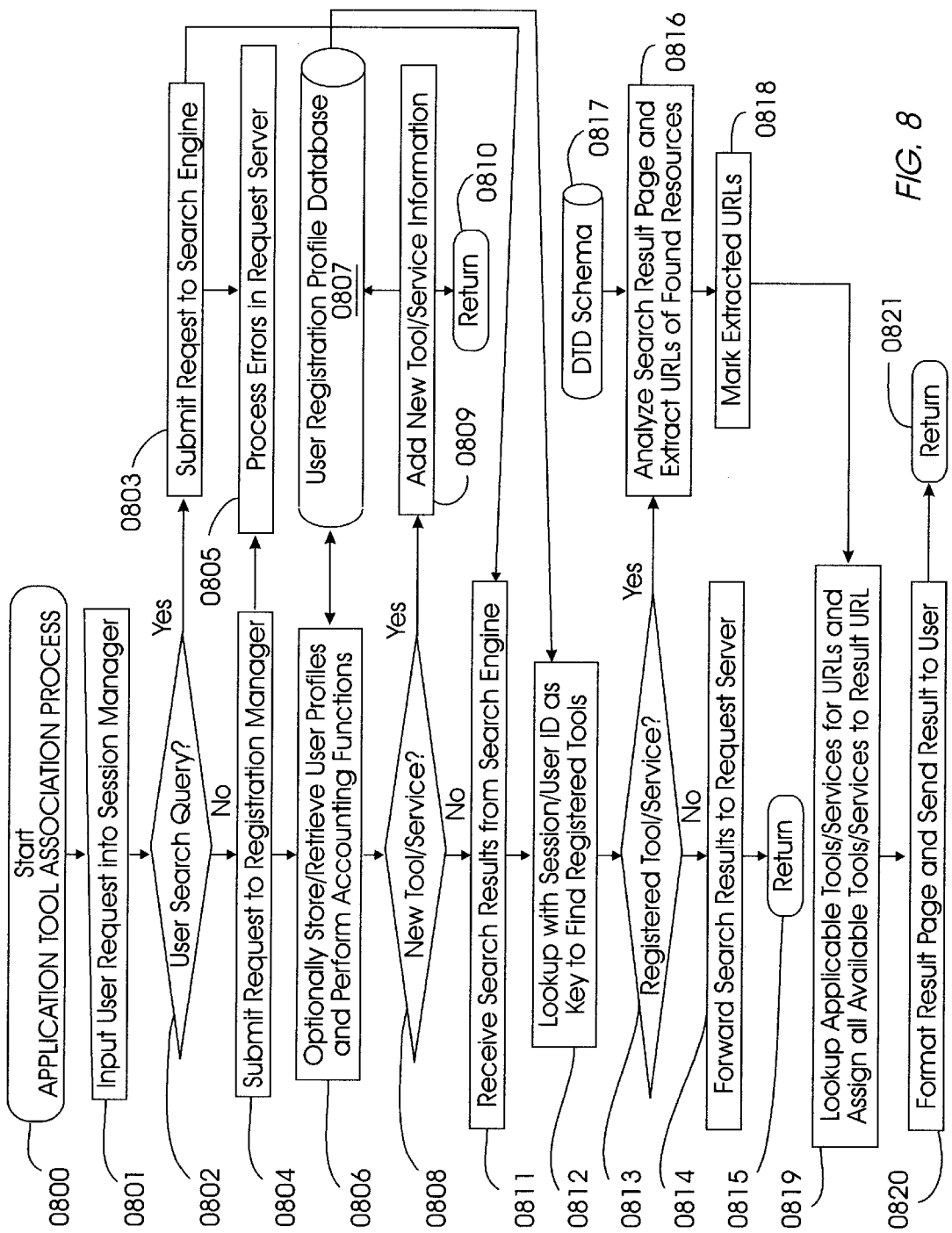
FIG. 8 illustrates a process flowchart of an exemplary embodiment of the present invention.

An exemplary general present invention method may best be understood by referencing the system diagrams of FIG. 7 and the exemplary flowchart of FIG. 8. These diagrams will now be discussed in detail.

Referencing FIG. 8, the exemplary Application Tool Association method (0800) involves the following steps:
(1) Obtaining an input request (typically from a user) (0801) and submitting the search request to a session manager.
(2) Determining if the user request is a search query (0802), and if so, submitting the request to a Search Engine (0803).
(3) Otherwise, submitting the user request to a Registration Manager (0804).
(4) Optionally processing errors from the Search Engine and Registration Manager with a Request Server (0805).
(5) Optionally storing and/or retrieving user profiles and/or accounting information (0806) in a Tools/Services Registration Database (0807).
(6) Determining if a new tool and/or service is to be registered (0808), and if so, adding new tool/service information (0809) to the Tools/Services Registration Database (0807), then exiting the tool/service update (0810).
(7) Otherwise, receiving Search Results from the Search Engine (0811).
(8) Looking up (using the Session/User ID as an indexing key) registered tools (0812) in the Tools/Services Registration Database (0807).
(9) Determining if there are registered tools (0813) in the Tools/Services Registration Database (0807), and if not, forwarding Search Results to a Request Server for display (0814) and exiting the tool mapping process (0815).
(10) Otherwise, analyzing the Search Results page (0816) using a DTD Schema (0817) and Extracting URLs of the found resources.
(11) Marking the Extracted URLs (0818).
(12) Looking up applicable tools/services for URLs and assigning all available tools/services to the resulting URL (0819).
(13) Formatting the Result Page and sending the result to the user (0820) via a browser or other means that may optionally be used to activate the applications associated with the search results by the Registration Manager.

One skilled in the art will recognize that these steps may be rearranged and/or augmented with no loss of generality in the teachings of the present invention.

Computer Software

As would be known by one skilled in the art and as indicated in FIGS. 7–8, the system and method described herein and generally illustrated in FIGS. 7–8 may be reduced to computer instruction codes and embodied on a computer readable storage means. This may take the form of a wide variety of storage media well known in the art and/or contemplated for future use. Thus, the present invention specifically anticipates the incorporation of the system and methods discussed herein in the form of tangible computer software products.

Furthermore, while not limiting the scope of the present invention, the present invention specifically anticipates that one or more components of the present invention may be implemented using the Microsoft® Windows™ operating environment in all its variations or its equivalent commercial embodiments, including but not limited to any system incorporating a graphical user interface.

Conclusion

A Application Tool Association system and method have been disclosed wherein information retrieved from a variety of search engine results may be automatically processed using tools selected by a user and maintained via references within a Tools/Services Registration database. As compared to the prior art, the present invention automates what was once a manual task—that of sele ting and activating data analysis tools that operate on data sets obtained from conventional search engines. Furthermore, the present invention provides in some circumstances the ability to both manually and automatically associate tools and/or services with the content of specific URLs, thus providing significantly more post-processing flexibility than is available with the prior art.

Significantly, the present invention provides a mechanism to automatically broker tools and/or services to end users, thus providing a sales mechanism for tool/service providers as well as a simple method for users to access a wide variety of tools and/or services without the overhead associated with tool/service maintenance.

Although a specific embodiment of the invention has been disclosed, it will be understood by those having skill in the art that changes can be made to this specific embodiment without departing from the spirit and scope of the invention. The scope of the invention is not to be restricted, therefore, to the specific embodiment, and it is intended that the appended claims cover any and all such applications, modifications and embodiments within the scope of the present invention.

What is claimed is:

1. A application tool association system comprising:
   (a) means for user registration of a tool and/or service;
   (b) means for invoking said tool and/or service;
   (c) means for search engine registration of said tool and/or service;
   (d) means for checking out said tool and/or service on a search result;
   (e) a results page extraction means;
   (f) a user export means;
   wherein
      said user registration means permits a user to associate a given tool and/or service with a search result;
      said invoking means permits said tool and/or service to be applied to a search results page;
      said search engine registration means permits said tool and/or service to be brokered to users on the client side;
      said checkout means provides a dialog choice box of different tools that can be applied to a given search result;
      said results page extraction means extracts the qualifying results page into a tool and/or service and executes the tool and/or service against said results page;
      said user export means exports the results page of said tool and/or service back to the user as a display page or as a page that is downloadable on the client side.

2. The application tool association system of claim 1 wherein said search result is obtained from an Internet search engine.

3. The application tool association system of claim 1 wherein said results page is displayed using an Internet web browser.

4. The application tool association system of claim 1 wherein said results page permits the activation of an application tool and/or service in response to user inputs.

5. The application tool association system of claim 1 wherein one or more components of said system is implemented on a personal computer (PC).

6. The application tool association system of claim 5 wherein said personal computer (PC) utilizes a graphical user interface.

7. The application tool association system of claim 6 wherein said graphical user interface utilizes a Microsoft® Windows™ operating environment.

8. An application tool association system comprising:
(a) a Session Manager;
(b) a Registration Manager;
(c) a Result Analyzer;
(d) a Tool/Service Integrator;
(e) a Request Server;
(f) a Tools/Services Registration Database;
(g) a DTD Schema; and
(h) an optional Accounting Manager;
wherein
said Session Manager applies user requests either to a search engine or to said Registration Manager;
said Registration Manager processes user requests to define new tools and/or services within said Tools/Services Registration Database;
said Result Analyzer processes the results of said user requests applied to said search engine based on said DTD Schema and said Tools/Services Registration Database and sends the results of same to said Request Server;
said Tool/Service Integrator performs a lookup of applicable tools and/or services for URLs detected by said Result Analyzer and provides said applicable tools to said Request Server for integration into a visual display directed at said user;
said Request Server formats a result page for display to said user using information from said Result Analyzer, said Registration Manager, and said Tool/Service Integrator; and
said Accounting Manageroptionally permits logging of accounting information within said Tools/Services Registration Database to permit brokering of said tools and/or services in response to said user requests.

9. The application tool association system of claim 8 wherein said search engine is an Internet search engine.

10. The application tool association system of claim 8 wherein said result page is displayed using an Internet web browser.

11. The application tool association system of claim 8 wherein said result page permits the activation of an application tool and/or service in response to user inputs.

12. The application tool association system of claim 8 wherein one or more components of said system is implemented on a personal computer (PC).

13. The application tool association system of claim 12 wherein said personal computer (PC) utilizes a graphical user interface.

14. The application tool association system of claim 13 wherein said graphical user interface utilizes a Microsoft® Windows™ operating environment.

15. An application tool association system comprising:
(a) a Session Manager means;
(b) a Registration Manager means;
(c) a Result Analyzer means;
(d) a Tool/Service Integrator means;
(e) a Request Server means;
(f) a Tools/Services Registration Database means; and
(g) a DTD Schema means;
(h) an optional Accounting Manager means;
wherein
said Session Manager means applies user requests either to a search engine means or to said Registration Manager means;
said Registration Manager means processes user requests to define new tools and/or services within said Tools/Services Registration Database means;
said Result Analyzer means processes the results of said user requests applied to said search engine based on said DTD Schema means and said Tools/Services Registration Database means and sends the results of same to said Request Server means;
said Tool/Service Integrator means performs a lookup of applicable tools and/or services for URLs detected by said Result Analyzer means and provides said applicable tools to said Request Server means for integration into a visual display directed at said user;
said Request Server means formats a result page for display to said user using information from said Result Analyzer means, said Registration Manager means, and said Tool/Service Integrator means; and
said Accounting Manager means optionally permits logging of accounting information within said Tools/Services Registration Database means to permit brokering of said tools and/or services in response to said user requests.

16. The application tool association system of claim 15 wherein said search engine is an Internet search engine.

17. The application tool association system of claim 15 wherein said result page is displayed using an Internet web browser.

18. The application tool association system of claim 15 wherein said result page permits the activation of an application tool and/or service in response to user inputs.

19. The application tool association system of claim 15 wherein one or more components of said system is implemented on a personal computer (PC).

20. The application tool association system of claim 19 wherein said personal computer (PC) utilizes a graphical user interface.

21. The application tool association system of claim 20 wherein said graphical user interface utilizes a Microsoft® Windows™ operating environment.

22. An application tool association method comprising:
(a) obtaining a user input request and submitting said search request to a Session Manager;
(b) determining if said user request is a search query, and if so, submitting said request to a Search Engine;
(c) otherwise, submitting said user request to a Registration Manager;
(d) optionally processing errors from said Search Engine and Registration Manager with a Request Server;
(e) optionally storing and/or retrieving user profiles and/or performing tool/service brokering accounting within a Tools/Services Registration Database;
(f) determining if a new tool and/or service is to be registered, and if so, adding new tool/service information to said Tools/Services Registration Database;
(g) otherwise, receiving Search Results from said Search Engine;
(h) looking up (using the Session/User ID as an indexing key) registered tools in the Tools/Services Registration Database;
(i) determining if there are registered tools in said Tools/Services Registration Database, and if not, forwarding Search Results to a Request Server for display and exiting the tool mapping process;

(j) otherwise, analyzing said Search Results page using a DTD Schema and Extracting URLs of the found resources;

(k) marking said Extracted URLs;

(l) looking up applicable tools/services for URLs and assigning all available tools/services to the resulting URL; and (m) formatting the Result Page and sending said result to said user via a browser or other means that may optionally be used to activate the applications associated with said search results by said Registration Manager.

23. The application tool association method of claim 22 wherein one or more steps is implemented on a personal computer (PC).

24. The application tool association method of claim 23 wherein said personal computer (PC) utilizes a graphical user interface.

25. The application tool association method of claim 24 wherein said graphical user interface utilizes a Microsoft® Windows™ operating environment.

26. An application tool association method comprising:

(a) means for obtaining a user input request and submitting said search request to a Session Manager;

(b) means for determining if said user request is a search query, and if so, submitting said request to a Search Engine;

(c) means for otherwise submitting said user request to a Registration Manager;

(d) means for optionally processing errors from said Search Engine and Registration Manager with a Request Server;

(e) means for optionally storing and/or retrieving user profiles and/or performing tool/service brokering accounting within a Tools/Services Registration Database;

(f) means for determining if a new tool and/or service is to be registered, and if so, adding new tool/service information to said Tools/Services Registration Database;

(g) means for otherwise receiving Search Results from said Search Engine;

(h) means for looking up (using the Session/User ID as an indexing key) registered tools in the Tools/Services Registration Database;

(i) means for determining if there are registered tools in said Tools/Services Registration Database, and if not, forwarding Search Results to a Request Server for display and exiting the tool mapping process;

(j) means for otherwise analyzing the Search Results page using a DTD Schema and Extracting URLs of the found resources;

(k) means for marking said Extracted URLs;

(l) means for looking up applicable tools/services for URLs and assigning all available tools/services to the resulting URL; and (m) means for formatting the Result Page and sending said result to said user via a browser or other means that may optionally be used to activate the applications associated with said search results by said Registration Manager.

27. The application tool association method of claim 26 wherein one or more steps is implemented on a personal computer (PC).

28. The application tool association method of claim 27 wherein said personal computer (PC) utilizes a graphical user interface.

29. The application tool association method of claim 28 wherein said graphical user interface utilizes a Microsoft® Windows™ operating environment.

30. A computer usable medium having computer-readable program code means providing application tool association, said computer-readable program means comprising:

(a) computer program code means for obtaining a user input request and submitting said search request to a Session Manager;

(b) computer program code means for determining if said user request is a search query, and if so, submitting said request to a Search Engine;

(c) computer program code means for otherwise submitting said user request to a Registration Manager;

(d) computer program code means for optionally processing errors from said Search Engine and Registration Manager with a Request Server;

(e) computer program code means for optionally storing and/or retrieving user profiles and/or performing tool/service brokering accounting within a Tools/Services Registration Database;

(f) computer program code means for determining if a new tool and/or service is to be registered, and if so, adding new tool/service information to said Tools/Services Registration Database;

(g) computer program code means for otherwise receiving Search Results from said Search Engine;

(h) computer program code means for looking up (using the Session/User ID as an indexing key) registered tools in the Tools/Services Registration Database;

(i) computer program code means for determining if there are registered tools in said Tools/Services Registration Database, and if not, forwarding Search Results to a Request Server for display and exiting the tool mapping process;

(j) computer program code means for otherwise analyzing the Search Results page using a DTD Schema and Extracting URLs of the found resources;

(k) computer program code means for marking said Extracted URLs;

(l) computer program code means for looking up applicable tools/services for URLs and assigning all available tools/services to the resulting URL; and (m) computer program code means for formatting the Result Page and sending said result to said user via a browser or other means that may optionally be used to activate the applications associated with said search results by said Registration Manager.

31. The computer usable medium of claim 30 wherein said medium is compatible with a personal computer (PC).

32. The computer usable medium of claim 31 wherein said computer code means utilizes a graphical user interface.

33. The computer usable medium of claim 32 wherein said graphical user interface utilizes a Microsoft® Windows™ operating environment.

* * * * *

Disclaimer

6,529,899—Reiner Kraft, Gilroy, CA (US); Neelakantan Sundaresan, San Jose, CA (US) SYSTEM AND METHOD FOR REGISTERING AND PROVIDING A TOOL SERVICE Patent dated Mar. 4, 2003. Disclaimer filed Oct. 4, 2006, by the assignee, International Business Machines Corporation.

Hereby enter this disclaimer to all claims, of said patent.

*(Official Gazette, January 9, 2007)*